United States Patent
Adam et al.

Patent Number: 5,268,606
Date of Patent: Dec. 7, 1993

[54] MOTOR PROVIDED WITH A BOTTOM RUN-OFF HOLE AND A RUN-OFF CHANNEL

[75] Inventors: Peter Adam, Höchberg; Rolf Deynet, Würzburg, both of Fed. Rep. of Germany

[73] Assignee: Siemens Aktiengesellschaft, Munich, Fed. Rep. of Germany

[21] Appl. No.: 959,187

[22] Filed: Oct. 9, 1992

[30] Foreign Application Priority Data

Oct. 11, 1991 [EP] European Pat. Off. ........ 91117416.7

[51] Int. Cl.⁵ .............................................. H02K 5/10
[52] U.S. Cl. .................................... 310/88; 310/42; 310/89
[58] Field of Search ............... 310/88, 85, 89, 42; 29/596; 220/DIG. 6; 312/229

[56] References Cited

U.S. PATENT DOCUMENTS

| | | | |
|---|---|---|---|
| 4,727,274 | 2/1988 | Adam et al. | 310/239 |
| 4,808,871 | 2/1989 | Morishita | 310/89 |
| 4,900,957 | 2/1990 | Barker | 310/88 |
| 4,945,270 | 7/1990 | Okamoto | 310/88 |
| 4,953,414 | 9/1990 | Ueno | 310/88 |
| 5,006,742 | 4/1991 | Strobl | 310/88 |
| 5,045,736 | 9/1991 | Amano | 310/89 |

FOREIGN PATENT DOCUMENTS

| | | |
|---|---|---|
| 0221304 | 5/1987 | European Pat. Off. |
| 1161352 | 1/1964 | Fed. Rep. of Germany |
| 3143000 | 5/1983 | Fed. Rep. of Germany ........ 310/88 UX |
| 2381447 | 10/1978 | France ............ 220/DIG. 6 |
| WO8806368 | 8/1988 | World Int. Prop. O. |

OTHER PUBLICATIONS

Patent Abstracts of Japan, vol. 11, No. 11, 13 Jan. 1987 & JP-A-61 185 037 (Hitachi Ltd.) 18 Aug. 1986.

*Primary Examiner*—R. Skudy
*Attorney, Agent, or Firm*—Kenyon & Kenyon

[57] ABSTRACT

A motor casing is provided which guarantees reliable run-off of condensation water from the inside of the casing to its outside, and which reliably prevents drop water from penetrating from the outside into the inside of the motor casing with a simple device. The motor includes a tab which is punched and bent from the casing pot base using a die provided for deep-drawing of the pot-shaped motor casing such that a run-off hole proceeding from the bottom edge of the motor casing upwards, with a drip-off tongue angled away downwards is obtained.

4 Claims, 1 Drawing Sheet

MOTOR PROVIDED WITH A BOTTOM RUN-OFF HOLE AND A RUN-OFF CHANNEL

BACKGROUND OF THE INVENTION

The present invention relates to a motor provided with a bottom run-off hole and a run-off channel, and in particular, to a motor adapted for use in a motor vehicle raising mechanism and having a pot-shaped motor casing. Such a motor is known from WO-A-8 806 368.

In the aforementioned known case, a cap-shaped end plate is adapted to be mounted on the front end of a cylinder-shaped motor casing and is provided with a run-off channel. The run-off channel runs parallel to the axial cap mantle. A run-off hole is produced in the region of the continuation of the run-off channel at the cap mantle by a subsequent machining of the end plate.

In another motor known from EP-B1-0 221 304, a radial run-off hole is provided at the bottom of the motor casing, in the casing mantle. Any moisture which has penetrated into the interior of the motor casing, or condensation water which has formed in the motor casing itself is supposed to flow out of the radial run-off hole. Unfortunately, such a drain opening does not always meet the required conditions. Since such a run-off hole is worked into the casing mantle from the outside of the metal casing, metal burrs are formed. These burrs can prevent the run-off of the moisture from the inside of the motor casing. In addition, there is the danger that a drop of water formed on the outside of the motor casing, in front of the drain opening, will be drawn into the interior of the motor casing when the rotor of the motor begins rotating.

The present invention seeks to provide a run-off device which ensures reliable run-off of condensation water from the inside of the motor casing to the outside and which is able to be simply designed and produced. That is, the present invention seeks to provide a run-off device which can reliably prevent drop water from the outside of the motor casing from penetrating into the inside of the casing.

SUMMARY OF THE INVENTION

The present invention does so by providing a tab being punched from a casing pot base to form a run off hole, except for a bottom edge which remains in one piece with the casing mantle and being angled to form a drip-off tongue. Punching the run-off hole with a deep-drawing die is preferred. Having the drip-off tongue form an angle of approximately 120° with the casing mantle is also preferred.

Creating a run-off hole which proceeds from the front side of the motor casing, in a simple working step, simultaneously from the inside of the motor to the outside of the motor by a punching step is possible according to the present invention. Such a run-off hole is burr-free, at least toward the inside of the motor casing. In addition, forming a drip-off tongue which runs from the bottom of the hole downwards, such that condensation water can run off unhindered from the inside to the outside, and such that no external water drop can form in front of the run-off hole, but rather is necessarily conducted away from the run-off hole via the drip-off tongue is also possible according to the present invention.

Producing the run-off hole can be simplified if the tab is punched and/or bent by the same deep-drawing die used to shape the pot-shaped motor casing. The drip-off tongue is advantageously angled by approximately 60° from the subsequent progression of the bottom of the motor casing.

A deep drawing die (not shown).

DETAILED DESCRIPTION

Figure 1:
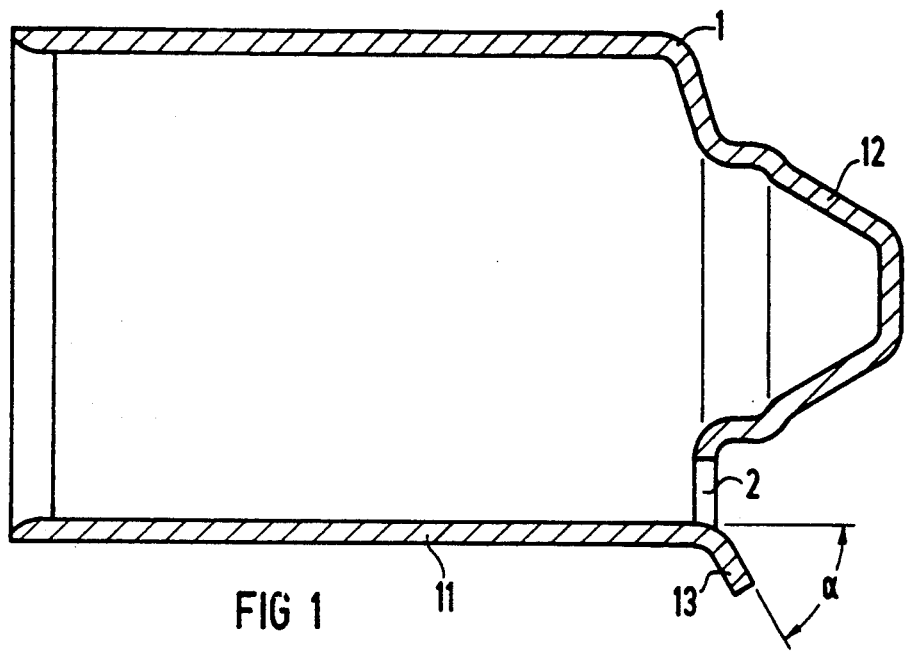
FIG. 1 depicts, in an axial cross-section along the line I—I in FIG. 2, the pot-shaped motor casing of an electric motor which may be used, for example, to drive a motor vehicle window raising mechanism.
Figure 2:
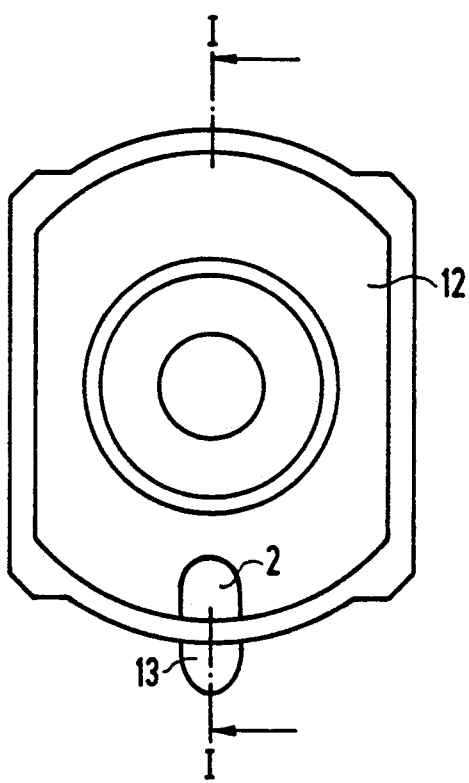
FIG. 2 is a front end view of the casing pot base of the motor casing according to FIG. 1.

FIGS. 1 and 2 show a one-piece pot-shaped motor casing of a commutator motor. Such a motor may be provided, for example, to drive a motor vehicle window raising mechanism. The motor casing includes a casing mantle 11 and a casing pot base 12. When such a commutator motor is completed, permanent magnets in the shape of partial shells are attached on the inside circumference of the motor casing mantle 11 for stator excitation, for example, and a first rotor bearing is held in the motor casing pot base 12. Subsequently, a rotor provided with a commutator winding and a commutator are inserted into the casing mantle from the left, open side of the motor casing 1. Finally, the open side of the motor casing 1 is closed off by an end plate which holds a second rotor bearing.

To guarantee that any condensation water which might form inside the motor casing 1 runs-off reliably and/or to reduce the penetration of external water drops into the interior of the motor casing 1 an axial run-off hole 2 and a drip-off tongue 13 are provided in the casing pot base 12. The drop-off tongue runs downward and proceeds radially outward from the bottom edge of the motor casing mantle 11. The run-off hole 2 is advantageously formed by punching a tab which is released from the motor pot base 12 having a bottom edge which remains connected in one piece with the motor casing mantle 11. In this way, the drip-off tongue 13 is formed by angling this tab radially outward.

A deep-drawing die (not shown) is used to form the pot-shaped motor casing from a metal sheet. Developing the deep-drawing die such that the tab can also be punched out of the housing pot base 12 while the motor casing is being formed, and such that the tab is already bent at least partially downwards is preferred.

Typically such a motor is arranged in a slanted manner with the pot base side offset downwards relative to the open frontal side of the motor casing 1. This slanted arrangement is especially prevalent in commutator motors provided to drive a motor vehicle window raising mechanism. In such a commutator motor, the run-off hole is typically provided at the lowest point of the motor casing.

Bending the drip-off tongue 13 relative to the subsequent progression of the bottom of the motor casing 1 to an angle of approximately 60° advantageously ensures that the drip-off tongue 13 functions properly i.e., that any moisture drop which might collect on the outside in front of the run-off hole 2 necessarily runs away from the run-off hole 2 along the drip-off tongue 13, to its bottom. Thus, any such moisture drops can no longer be drawn into the interior of the motor casing by the turning rotor.

In a motor casing provided with a run-off hole 2, and in particular, in a pot shaped motor casing, to guarantee reliable run-off of condensation water from the inside of the motor casing to its outside or to prevent drop water from penetrating from the outside into the interior of the motor casing 1 with simple means, a tab is punched from the housing pot base 12 and bent, using the die provided for deep-drawing of the pot-shaped motor casing 1, such that a run-off hole 2 proceeding from the bottom edge of the motor casing 1 upwards, with a drip-off tongue 13 angled away downwards is obtained.

What is claimed is:
1. A pot-shaped motor casing comprising:
 a) a casing mantle;
 b) a casing pot base; and
 c) a tab, said tab being punched from said casing pot base thereby forming an axial run-off hole except for a bottom edge which remains in one piece with said casing mantle and being angled from said casing mantle thereby forming a drip-off tongue.

2. The pot-shaped motor casing of claim 1 wherein said pot-shaped motor casing is deep-drawn as a sheet metal part.

3. The motor casing of claim 1 wherein said drip-off tongue forms an angle of approximately 120° with said casing mantle.

4. The motor casing of claim 2 wherein said drip-off tongue forms an angle of approximately 120° with said casing mantle.

* * * * *